April 14, 1942. C. PFEIFER 2,280,006

TIRE RIVET

Filed May 8, 1940

INVENTOR
CARL PFEIFER
BY
Jerald P. Welch
ATTORNEY

Patented Apr. 14, 1942

2,280,006

UNITED STATES PATENT OFFICE 2,280,006

TIRE RIVET

Carl Pfeifer, Milwaukee, Wis.

Application May 8, 1940, Serial No. 333,891

1 Claim. (Cl. 152—370)

This invention relates to improvements in tire rivets, and more particularly to a novel tire rivet of a type having a separate base and patch.

An object of the invention is to provide a device of the type which can be centered with respect to a break in the structure which is being patched in a manner which is not possible with other devices of the type now in use.

Another object of the invention is to provide a patch separate from the base and stem of the rivet, and which can be made of similar material having a relatively greater resistance to stresses and strains.

Other and further objects of the invention will appear as the description proceeds, reference being had to the accompanying drawing, in which.

Figure 1:
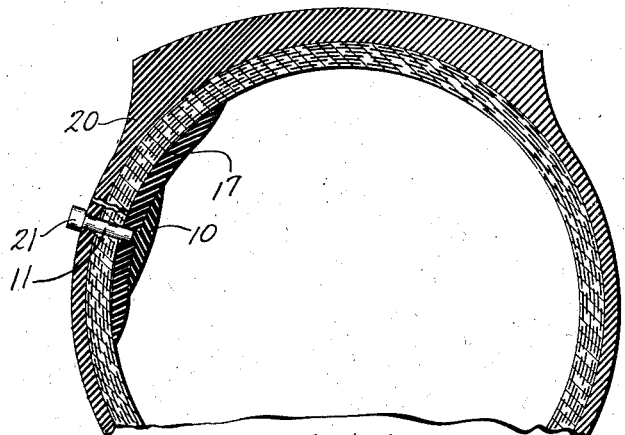
Fig. 1 is a view partly in section and partly in elevation of a tire rivet embodying my invention.
Figure 2:
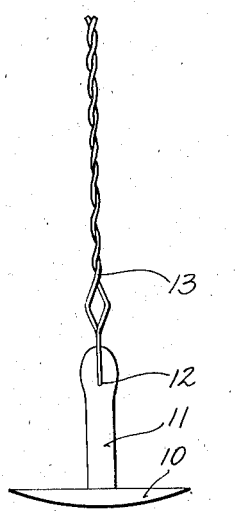
Fig. 2 is a side view in elevation of the integral base and stem of the rivet.

Referring more particularly to the drawing, the numeral 10 refers to the base of the device, having a stem 11, apertured at 12 to accommodate the twisted pull wire 13.

In one form of the invention a circular patch member 14, having the concentric ribs 15 and the central aperture 16 is placed on the stem 11 so as to abut against the base 10.

Figure 3:
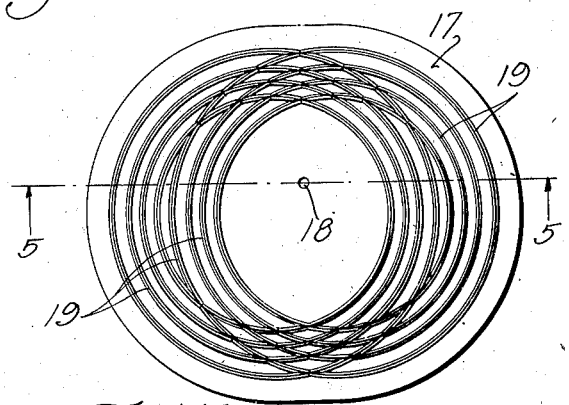
Fig. 3 is a plan view of a large patch showing the off-center molded aperture therein.
Figure 5:
Fig. 5 is a side view in section of the large patch.
Figure 6:
Fig. 6 is a side sectional view of the smaller patch.
Figure 4:
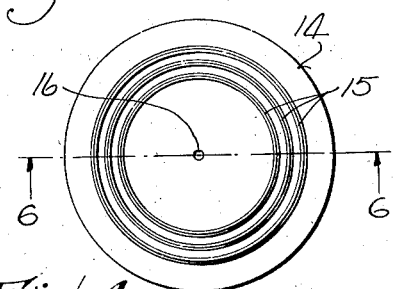
Fig. 4 is a plan view of the smaller centrally apertured patch.

In another form of the invention the patch is oval and relatively larger as shown in Fig. 3 of the drawing, the said patch being designated by the numeral 17, having the off-center aperture at 18 thereof, and the symmetrically intersecting ribs 19 on the contact face thereof.

The patches 14 and 17 may be constructed of material similar to that forming the integral stem and base, but the material forming the patches in the preferred form of the invention is of a stronger quality and character. The stem has to be formed of an elastic substance in order to stretch properly as it is pulled through the hole or break in the article, such as a tire casing, to be repaired. The integral base must necessarily be constructed of the same elastic material, and while in the case of a small hole the base itself might provide a suitable closure, it has been found that the extra patch 17 forms a more adequate repair, inasmuch as the latter can be formed of a more rigid material.

In use, the patch 14 and the stem 11 are covered with rubber cement, and the pull wire 13 is pushed through the puncture hole in a tire casing from the inside. The stem 11 is pulled through until the ribbed and cemented side of the patch 14 is held tightly in place against the inside of the tire. The stem is then cut off adjacent to the outside of the casing 20, where because of its elastic character it forms the rivet end 21.

In case of a large break in a tire casing, the oval patch 17 having the off-center aperture is used. First a hole is punched in the casing near the break to be repaired, and the stem is pulled therethrough, while the patch is adjusted so that its center will cover the break. Apertures 16 and 18 are molded in the patches 14 and 17, and are thus better able to withstand the expansive pressure of the stem 11.

It will be understood that the device is capable of various modifications in structure and design, without departing from the spirit of the invention, within the scope of the appended claim.

Having thus described the invention, what is claimed and desired to be secured by Letters Patent of the United States, is:

A device of the character described comprising a stem and base of relatively elastic material, and a patch of relatively inert and tougher material having an aperture therein to receive the stem.

CARL PFEIFER.